C. B. EARNHEART.
PRESSURE INDICATING VALVE.
APPLICATION FILED AUG. 24, 1917.
1,305,265.
Patented June 3, 1919.
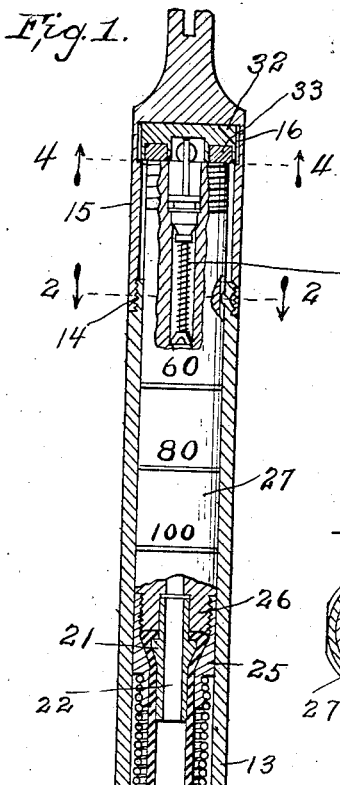
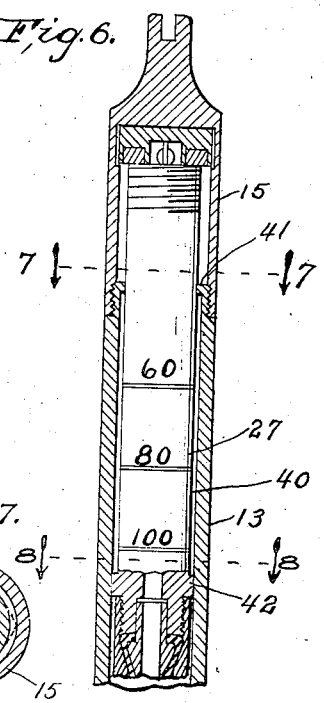
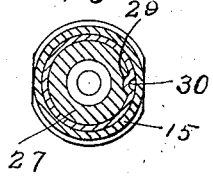
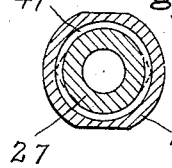
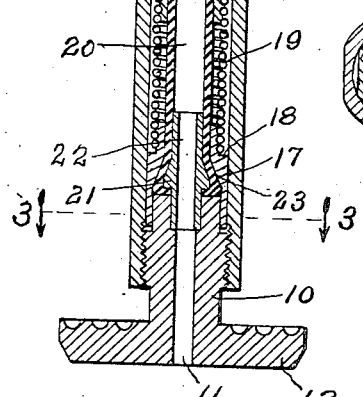
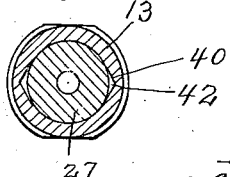
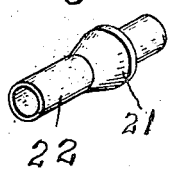
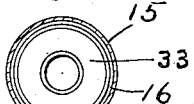
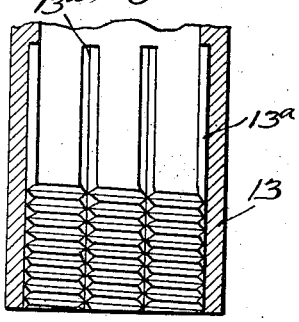
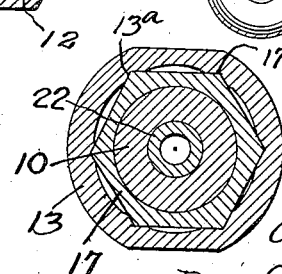
Inventor:
Chauncey B. Earnheart
By Lockwood & Lockwood
Attorneys.

UNITED STATES PATENT OFFICE.

CHAUNCEY B. EARNHEART, OF INDIANAPOLIS, INDIANA, ASSIGNOR TO SAFETY FIRST DEVICES COMPANY, OF INDIANAPOLIS, INDIANA, A CORPORATION.

PRESSURE-INDICATING VALVE.

1,305,265.  Specification of Letters Patent.  Patented June 3, 1919.

Application filed August 24, 1917. Serial No. 188,036.

*To all whom it may concern:*

Be it known that I, CHAUNCEY B. EARNHEART, a citizen of the United States, and a resident of Indianapolis, county of Marion, and State of Indiana, have invented a certain new and useful Pressure-Indicating Valve; and I do hereby declare that the following is a full, clear, and exact description thereof, reference being had to the accompanying drawings, in which like letters refer to like parts.

The object of this invention is to improve the construction of air valves used in connection with pneumatic rubber tires and the like. It is desirable in the practical manufacture and output of such valve to have the parts thereof so made in shape that they can be put together without any great care and yet without any risk or danger of being improperly assembled or so that they will not operate successfully. The air valve structure herein shown accomplishes the object sought, inasmuch as anybody, even one unskilled, can assemble the same, and when assembled, will be absolutely air-tight and the gage will operate smoothly and without torsional friction.

This present invention obviates the necessity of using special machines as well as dispensing with skilled labor in assembling them.

Furthermore, the improved construction can be manufactured for from fifteen to twenty per cent. less cost than heretofore.

The full nature of the invention will be understood from the accompanying drawings and the following description and claims:

In the drawings, Figure 1 is a central longitudinal section of one form of the air valve, some parts, however, not being shown in section. Fig. 2 is a cross section on the line 2—2 of Fig. 1. Fig. 3 is a section on the line 3—3 of Fig. 1. Fig. 4 is a section on the line 4—4 of Fig. 1. Fig. 5 is a perspective view of the metal union between the valve stem proper and the rubber tube connection thereof with the valve carrying and indicating member. Fig. 6 is a central vertical section through the upper part of the valve showing a modified construction and the lower part being broken away. Fig. 7 is a section on the line 7—7 of Fig. 6. Fig. 8 is a section on the line 8—8 of Fig. 6. Fig. 9 is an enlarged central longitudinal sectional view through the lower end of the valve sleeve. Fig. 10 is a view similar to Fig. 3 on an enlarged scale.

There is shown in the drawings a short valve stem 10 with a central free air passage 11 therethrough, and with a flange 12 on the lower end, whereby it is secured in place to the pneumatic tire, which is not shown. There is a sleeve 13 internally threaded at its lower end where it screws on the valve stem 10. This sleeve is externally threaded like the ordinary valve stems of other constructions for receiving the usual dust cap, which is not here shown. The outer end of the sleeve is externally reduced in diameter and threaded as shown at 14 to receive the cap 15 which screws thereon. The internal diameter of the cap is slightly greater than that of the sleeve and in the upper part of the cap there is a chamber 16 which is of still slightly greater diameter, as shown in the upper part of Fig. 1.

The outer end of the short valve stem 10 is reduced somewhat in diameter, but not externally threaded. The lower end of the sleeve is internally threaded to screw on the externally threaded portion of the stem 10, and the inner surface of said sleeve is also provided with vertically extending V-shaped ways 13ª so arranged as to make a portion of the sleeve substantially hexagonal in form so as to receive slidably and loosely a circular spring holder 17, the external surface of which is hexagonal and smooth, the corners 17ª made by the hexagonal faces entering said V-shaped ways. It has a reduced upper portion which leaves an outer shoulder 18, which abuts against overhanging portions of the sleeve at the upper ends of the ways. The right and left spiral of spring 19 surrounds the reduced portion of the spring holder 17 and abuts against the shoulder 18. Within said spiral spring there is a flexible, air tight, rubber tube 20, the lower end of which projects into the spring holder 17 and surrounds the conical enlarged portion 21 of the tubular metal union 22 which forms a connection between said rubber tube and the valve stem 10. The lower end of the union projects into a suitable seat formed in the upper part of the valve stem. The lower end of the upper tube overlaps the conical enlargement 21 and hugs the reduced lower end of the union 22. The spring holder 17 has a conical enlargement 23 in its inner surface which parallels and surrounds the outer surface of the conical enlargement 21 of the union 22. Therefore, when the sleeve 13 is screwed down on the valve stem, it forces the conical inner wall with the spring holder 17 down on the rubber tube 20 which frictionally engages the flaring conical portion 21 of the metal union 22 and forces said union down into the valve stem so as to pinch the lower end of the tube 20 between the upper end of the valve stem and the conical enlargement 21 on said union, and thus make the structure absolutely air tight and anybody, however unskilled, can unite these parts as there is only one way in which they can be brought together, and when thus brought together are perfectly fitted and united as desired.

Around the upper end of the rubber tube there is another spring holder 25 which is externally cylindrical and smooth and fits in the smooth cylindrical portion of the sleeve 13 so as to be longitudinally movable therein. It has a lower reduced portion to which the upper end of the spring 19 is secured. The upper end of the spring holder 25 is internally threaded to receive the lower externally threaded end 26 of the tubular valve carrying member 27. There is a metal tubular union 22 exactly similar to the union 22 at the lower end having a similar conical enlargement 21 and it fits in and is surrounded by the upper end of the rubber tube in the same way and the upper end of said union projects into the lower portion 26 of the valve-carrying member 27 so that when the latter is screwed down in the spring holder 25, it will pinch and clamp in place the upper end of the rubber tube so as to make it absolutely air tight and anybody can assemble these parts however unskilled.

The member 27 is always subject to the direct pressure of the air in a pneumatic tire since there is an unobstructed air passage through the stem 10, the union 22 and the rubber tube 20 and, therefore, such air pressure is indicated by graduations and numerals on the member 27 as they bear above the upper end of the sleeve 13, when the cap 15 is removed. The member 27 also carries a check valve 28 which is of the usual type. Said member 27 has in it longitudinal grooves 29, into which lugs or indentations 30, extending inwardly from the upper part of the sleeve 13, project loosely, for the purpose of preventing any turning or torsional movement of the gage or valve-carrying member 27, when the pump hose connection is being screwed thereon. The lug 30 will also engage the upper end of the spring holder 25 and prevent the parts from escaping outwardly from the sleeve 13. Otherwise the parts might be pulled or pushed out by excessive air pressure.

The cap 15, as stated, has in it the enlarged recess 16 for receiving a gasket holder 32 in a loose condition when the gasket holder has been inserted in place. This gasket holder has an annular recess in it for receiving the gasket ring 33 which engages the upper end of the valve-carrying member 27 to render the same air tight and prevent any escape of air. The gasket holder 32 is loose so that it will not turn with the cap as the latter is screwed on and thus wear away the gasket while in frictional engagement with the upper end of the member 27. The external diameter of the holder 32 is just large enough to make it possible to forcibly insert said holder through the cap 15 to its seat or recess 16. That enables the holder 32 to be loose in said recess and yet it cannot escape from the cap. This arrangement greatly prolongs the life of the gasket.

The modified form shown in Figs. 6, 7 and 8, differs from the construction heretofore described in the means for preventing the indicator and valve-carrying member 27 from turning in the sleeve 13 when the hose connection is being attached or when the cap 15 is being screwed on it. The sleeve 13 has in its inner wall two oppositely located longitudinally extending V-shaped slots 40 which extend from its lower end almost to the upper end so as to leave a stop 41 at the upper end, as seen in Fig. 6. The member 27 has two oppositely located V-shaped projections 42 which loosely project into these slots and guide the member 27 in its vertical movements and prevent the same from turning and also, in view of the stops 41, from escaping from the sleeve 13.

From the foregoing description, it is seen that the construction and assembly of this mechanism is such as to enable unskilled people to put the parts together only in one way and when put together they render the parts air tight and in satisfactory condition.

The invention claimed is:

1. Valve mechanism for pneumatic tires and the like, including a valve stem externally threaded, a sleeve thereon, a valve-carrying gage member in said sleeve, a rubber tube connecting the valve-carrying member and the stem, a metal union projecting into the valve stem and the adjacent end of the rubber tube and having a shoulder enlargement over which the end of the rubber tube is stretched and between which and the valve stem the end of the rubber tube is pinched to make an air tight connection, and means surrounding the rubber tube and said enlargement of the metal union for forcing said shoulder and metal union toward the valve stem.

2. Valve mechanism for pneumatic tires and the like, including a valve stem externally threaded, a sleeve adapted to screw thereon, a valve-carrying gage member in said sleeve, a rubber tube connecting the valve carrying member and the stem, a metal union projecting into the valve stem and the adjacent end of the rubber tube and having a conical shoulder enlargement over which the end of the rubber tube is stretched and between which and the valve stem the end of the rubber tube is pinched to make an air tight connection, and a tubular member holding said union from outward movement and having a conical inner surface surrounding said tube and the conical enlargement on the metal union so that when the sleeve is screwed down onto the valve stem, said surrounding tubular member will force the shoulder portion of the metal union against the overlapping ends of the rubber tube for making an air tight joint.

3. Valve mechanism for pneumatic tires and the like, including a valve stem externally threaded, a sleeve thereon, a valve-carrying gage member in said sleeve, a rubber tube connecting the valve-carrying member and the stem, a metal union projecting into the valve stem and the adjacent end of the rubber tube and having a conical shoulder enlargement over which the end of the rubber tube is stretched and between which and the valve stem the end of the rubber tube is pinched to make an air tight connection, a spiral spring surrounding said rubber tube and connecting said valve carrying member and valve stem, and a spring holder at the lower end of said spring and in said sleeve and held from outward movement therein and having a conical inner surface surrounding and engaging the rubber tube on the conical enlargement of said metal union.

4. Valve mechanism for pneumatic tires and the like, including a valve stem externally threaded, a sleeve adapted to screw thereon, a valve-carrying gage member in said sleeve, a rubber tube connecting the valve carrying member and the stem, a metal union projecting into the valve stem and the adjacent end of the rubber tube and having a conical shoulder enlargement over which the end of the rubber tube is stretched and between which and the valve stem the end of the rubber tube is pinched to make an air tight connection, and a tubular member holding said union outward from movement and having a conical inner surface surrounding said tube and the conical enlargement on the metal union so that when the sleeve is screwed down onto the valve stem, said surrounding tubular member will force the shoulder portion of the metal union against the overlapping ends of the rubber tube for making an air tight joint, parts of said tubular member engaging parts of the sleeve to prevent the outward movement of said tubular member.

5. Valve mechanism for pneumatic tires and the like, including a valve stem externally threaded, a sleeve thereon, a valve-carrying gage member in said sleeve, a rubber tube connecting the valve-carrying member and the stem, metal unions for connecting one end of said tube with the valve stem and the other end of said tube with the valve-carrying member, each of said metal unions having an intermediate conical enlargement with a shoulder over which an end of the tube extends, and tubular members within the sleeve each surrounding the conical enlargement of a metal union and having a conical inner surface and being movable in one direction, whereby one end of the rubber tube will be pinched between the valve stem and the conical enlargement of one metal union and the other end of the metal union will be pinched between the end of the valve-carrying member and the conical enlargement of the other metal union and the connection thereby be made air tight.

6. Valve mechanism for pneumatic tires and the like, including a valve stem, a sleeve secured thereto, a valve-carrying gage member in said sleeve, a rubber tube connecting the valve stem with said valve-carrying member so as to leave an unobstructed passageway through the valve stem and tube, a metal union for connecting the tube with the valve-carrying member having a conical enlargement over which the end of the tube extends, a tubular member connected with the valve carrying member so as to move therewith and having a conical inner surface surrounding the conical enlargement on the metal union, and means for connecting said tubular member to said valve carrying member and pinching the end of the tube between the valve carrying member and metal union.

In witness whereof, I have hereunto affixed my signature.

CHAUNCEY B. EARNHEART.